(12) United States Patent
Choi et al.

(10) Patent No.: US 8,461,287 B2
(45) Date of Patent: Jun. 11, 2013

(54) POLYMER ELECTROLYTE MEMBRANE (75) Inventors: Seong-Ho Choi, Daejeon (KR); Won-Ho Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/061,600

(22) PCT Filed: Nov. 4, 2009

(86) PCT No.: PCT/KR2009/006467
§ 371 (c)(1),
(2), (4) Date: Mar. 1, 2011

(87) PCT Pub. No.: WO2010/053297
PCT Pub. Date: May 14, 2010

(65) Prior Publication Data
US 2011/0166241 A1 Jul. 7, 2011

(30) Foreign Application Priority Data

Nov. 4, 2008 (KR) .................. 10-2008-0108773
Nov. 4, 2009 (KR) .................. 10-2009-0105949

(51) Int. Cl.
*C08G 8/02* (2006.01)
(52) U.S. Cl.
USPC .............. 528/125; 528/471; 528/373; 521/27

(58) Field of Classification Search
USPC ...... 525/125, 471; 528/373, 125, 471; 521/27
See application file for complete search history.

(56) References Cited

U.S. PATENT DOCUMENTS

| 2004/0126666 | A1 | 7/2004 | Cao et al. |
| 2004/0186262 | A1 | 9/2004 | Maier et al. |
| 2005/0154178 | A1* | 7/2005 | Bender .......................... 528/80 |
| 2006/0134494 | A1 | 6/2006 | Shin et al. |
| 2008/0004443 | A1 | 1/2008 | Brunelle et al. |

FOREIGN PATENT DOCUMENTS

| JP | 2007-523230 | 8/2007 |
| KR | 10-2007-0054314 A | 5/2007 |
| TW | 200621846 A | 7/2006 |
| TW | 200806707 A | 2/2008 |
| WO | WO/2006/065068 A1 | 6/2006 |
| WO | WO/2006/068369 A1 | 6/2006 |

* cited by examiner

*Primary Examiner* — Shane Fang
(74) *Attorney, Agent, or Firm* — McKenna Long & Aldridge, LLP (57) ABSTRACT

Disclosed are a multi-block copolymer, its producing method and an electrolyte membrane using the same. The multi-block copolymer includes a hydrophobic block having a plurality of repeating units represented as chemical formula 1; and a hydrophilic block having a plurality of repeating units represented as chemical formula 2. The multi-block copolymer is acidified, and can be used to an electrolyte membrane and a fuel cell. The use of the multi-block copolymer as an electrolyte membrane ensures excellent dimensional stability.

3 Claims, 2 Drawing Sheets

POLYMER ELECTROLYTE MEMBRANE

This application claims priority to PCT/KR2009/006467, filed on Nov. 4, 2009 and Korean Patent Application Nos. 10-2008-0108773 filed on Nov. 4, 2008 and 10-2009-0105949 filed on Nov. 4, 2009 all of which are hereby incorporated by reference in their entirety.

BACKGROUND OF THE INVENTION

1. Field of the Invention

The present invention relates to a multi-block copolymer, its producing method and an electrolyte membrane using the same. More particularly, the present invention relates to a branched multi-block copolymer that can be used as an electrolyte membrane of fuel cells applicable to distributed power generation systems, steam supply and power generation systems, power sources of zero emission vehicles, power sources for business, power sources for domestic applications, power sources for mobile devices and so on, and its producing method, an electrolyte membrane made from said copolymer and a fuel cell comprising said electrolyte membrane.

2. Description of the Related Art

Recently, it is expected that conventional energy sources such as oil or charcoal will be exhausted, and thus interests in alternative energy are increasing. Among alternative energy, a fuel cell has high efficiency and abundant energy sources and does not cause emission of pollutants such as Nox, SOx and so on, and thus it becomes the object of attention.

The fuel cell is an electricity generation system for converting energy in a chemical reaction between a fuel and an oxidant into electrical energy. Typically, the fuel cell uses hydrocarbon including hydrogen, methanol, butane and so on as a fuel, and oxygen as an oxidant.

In the fuel cell, a membrane electrode assembly (MEA) is a basic unit for generating electricity. The MEA includes an electrolyte membrane, and an anode and a cathode formed on the opposite side of the electrolyte membrane. The principles of electricity generation in a fuel cell is represented as the following reaction formula 1. Referring to reaction formula 1 (in the case of a fuel cell using hydrogen), oxidation of a fuel occurs at an anode to create hydrogen ions and electrons. The hydrogen ions and electrons move to a cathode through an electrolyte membrane. In the cathode, the hydrogen ions and electrons transmitted through the electrolyte membrane react with oxygen (oxidant) to produce water. The electrons also move to an external circuit.

Anode: $H_2 \rightarrow 2H^+ + 2e^-$

Cathode: $1/2O_2 + 2H^+ + 2e^- \rightarrow H_2O$

Entire: $H_2 + 1/2O_2 \rightarrow H_2O$  [Reaction formula 1]

A polymer electrolyte membrane fuel cell (PEMFC) is a type of fuel cell having good energy efficiency, high current density and output density, short operating time and rapid response characteristics to changes in load. An electrolyte membrane of the PEMFC should have high hydrogen ion conductivity, chemical stability and thermal stability at an operating temperature, low gas permeattivity, and in particular, excellent mechanical strength as a separator. In addition to the above-mentioned requirements, the electrolyte membrane needs a manufacturing method of competitive price and environmental friendliness for commercialization.

A fluorine-based electrolyte material, for example, Nafion made by Du Pont, Dow Membrane, Aciplex made by Asahi Chemical and so on, has the reduced hydrogen ion conductivity at a low-humidity and high-temperature process and high production cost. To solve this problem, studies have been made on a nonfluorine-based polymer containing a heat-resistant polymer backbone and a polar functional group attached to the backbone for giving a function as a polymer electrolyte. Of the nonfluorine-based polymer, a poly(arylene ether)-based polymer has an aromatic derivative and an ether bond, and thus it is resistant to heat and chemicals and has excellent mechanical strength and durability and low production cost.

Dimensional stability is one of important characteristics for a polymer electrolyte membrane of a fuel cell because the fuel cell produces a great amount of water, however, so far, any teaching did not disclose a nonfluorine-based polymer electrolyte membrane having advanced dimensional stability.

SUMMARY OF THE INVENTION

It is an object of the present invention to provide a multi-block copolymer that can be used as an electrolyte membrane of a fuel cell and has excellent mechanical strength and chemical stability and advanced dimensional stability, its producing method and an electrolyte membrane made from said multi-block copolymer.

To achieve the object, a branched multi-block copolymer according to the present invention comprises a hydrophobic block having a plurality of repeating units represented as chemical formula 1; and a hydrophilic block having a plurality of repeating units represented as chemical formula 2,

[Chemical formula 1]

[Chemical Formula 2]

where A, X and Y are each independently,
R is —NO₂ or —CF₃,
Z is

Q is —SO₃H, —SO₃H, —SO₃⁻M⁺, —COOH, —COO⁻M⁺, —PO₃H₂, —PO₃H⁻M⁺ or —PO₃²⁻2M⁺, preferably —SO₃H or —SO₃⁻M⁺, and M is Na or K, B is G is X, and G' is Z, 0<u/t<1, and 0<w/v<1, 0.7<(e+1.5*g)/(f+h)≦0.95 or 0.7<(f+h)/(e+1.5*g)≦0.95, and a+e+1.5(c+g)=f+h+b+d, in which a, b, c, d, e, f, g and h are molar ratios.

Preferably, the hydrophobic block may have the total number of repeating units of about 45 to 165, and hydrophilic block may have the total number of repeating units of about 100 to 350, however the present invention is not limited in this regard.

And, to achieve the object, a method for producing a branched multi-block copolymer according to an aspect of the present invention comprises (S1) forming a branched hydrophilic block by dissolving a bisphenol-based monomer or an aromatic dihalogen-based monomer; a phenol-based monomer having acid substituents, a bisphenol-based monomer having acid substituents or an aromatic dihalogen-based monomer having acid substituents; and a brancher in an organic solvent and polymerizing them; and (S2) dissolving said branched hydrophilic block formed in the step (S1), a bisphenol-based monomer, an aromatic dihalogen-based monomer and a brancher in an organic solvent and polymerizing them to produce a branched hydrophobic block and a branched multi-block copolymer at the same time.

Further, to achieve the object, a method for producing a branched multi-block copolymer according to another aspect of the present invention comprises (S1) forming a branched hydrophobic block by dissolving a bisphenol-based monomer, an aromatic dihalogen-based monomer and a brancher in an organic solvent and polymerizing them; and (S2) dissolving said branched hydrophobic block formed in the step (S1) and a bisphenol-based monomer or an aromatic dihalogen-based monomer; a phenol-based monomer having acid substitutents, a bisphenol-based monomer having acid substitutents or an aromatic dihalogen-based monomer having acid substitutents; and a brancher in an organic solvent and polymerizing them to produce a branched hydrophilic block and a branched multi-block copolymer at the same time.

In the producing method of the present invention, the aromatic dihalogen-based monomer and the phenol-based or bisphenol-based monomer are selected to effect a reaction therebetween in the step for forming a hydrophilic block. Based on the monomers and the brancher, the total equivalent weight of a hydroxy group to the total equivalent weight of a halogen group is more than 70/100, not exceeding 95/100, or the total equivalent weight of a halogen group to the total equivalent weight of a hydroxy group is more than 70/100, not exceeding 95/100. And, throughout the steps (S1) and (S2), the total equivalent weight of a hydroxy group is the same as the total equivalent weight of a halogen group, based on the monomers and the branchers.

In addition, the present invention provides a method for producing an acidified branched multi-block copolymer, further comprising substituting sulfonic acid for sulfonate by adding an acid solution to said branched multi-block copolymer. The acidified branched multi-block copolymer may be used to manufacture a polymer electrolyte membrane and a fuel cell.

EFFECTS OF THE INVENTION

The branched multi-block copolymer according to the present invention has a shorter hydrophilic block chain than conventional copolymers, consequently excellent mechanical strength and chemical stability and advanced dimensional stability resulted from low water uptake and swelling ratio. Thus, the use of the multi-block copolymer as an electrolyte membrane ensures performance improvement of a fuel cell.

BRIEF DESCRIPTION OF THE DRAWINGS

Other objects and aspects of the present invention will become apparent from the following description of embodiments with reference to the accompanying drawing in which.

DESCRIPTION OF THE PREFERRED EMBODIMENT

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

A branched multi-block copolymer according to the present invention comprises a hydrophobic block having a plurality of repeating units represented as chemical formula 1, and a hydrophilic block having a plurality of repeating units represented as chemical formula 2.

The branched multi-block copolymer according to the present invention is obtained by polymerizing a branched hydrophobic block without acid substituents and a branched hydrophilic block with acid substituents, thereby eliminating the need for post-sulfonation or crosslinking of a sulfonated polymer. Here, a brancher directly forms a main chain of the copolymer. In the branched multi-block copolymer, the hydrophobic block and the hydrophilic block are chemically bonded to each other in an alternate manner. The hydrophobic block maintains the mechanical integrity of a membrane and the hydrophilic block gives ion conductivity to the membrane.

That is, the hydrophobic block of the present invention may be represented as chemical formula 3.

[Chemical formula 3]

And, the hydrophilic block of the present invention may be represented as chemical formula 4.

[Chemical formula 4]

In the chemical formulas 3 and 4, A, X and Y are each

-continued independently,
R is —NO$_2$ or —CF$_3$,
Z is

Q is —SO₃H, —SO₃⁻M⁺, —COOH, —COO⁻M⁺, —PO₃H₂, —PO₃H⁻M⁺ or —PO₃²⁻2M⁺, preferably —SO₃H or —SO₃⁻M⁺, and M is Na or K, B, a brancher, is G is X, and G' is Z,
K is F, Cl, Br, I, No₂ and OH, $0 < u/t < 1$, and $0 < w/v < 1$,
$0.7 < (e+1.5*g)/(f+h) \leqq 0.95$ or $0.7 < (f+h)/(e+1.5*g) \leqq 0.95$, and $a+e+1.5(c+g)=f+h+b+d$, in which a, b, c, d, e, f, g and h are molar ratios.

The hydrophobic block may have the total number of repeating units of about 45 to 165, and hydrophilic block may have the total number of repeating units of about 100 to 350, however the present invention is not limited in this regard.

The inventors have disclosed a branched multi-block copolymer in Korean Patent No. 657740. According to this technique, the branched multi-block copolymer comprises a plurality of hydrophilic blocks and a plurality of hydrophobic blocks. In the case that the multi-block copolymer is used as an electrolyte membrane, a unique morphology is created due to interaction among the hydrophilic blocks and the hydrophobic blocks. In particular, the hydrophilic blocks approach each other due to attractive interaction, and consequently, a channel for proton conduction is created. Accordingly, the branched multi-block copolymer is proper as an electrolyte membrane of a fuel cell.

However, a conventional electrolyte membrane for a fuel cell has high ion conductivity but poor dimensional stability. Thus, the inventors have made many studies and various attempts to develop an electrolyte membrane with excellent dimensional stability, and attained the present invention.

Specifically, a hydrophilic or hydrophobic block of a branched multi-block copolymer is formed by reacting a phenol-based or bisphenol-based monomer having a hydroxy group with an aromatic dihalogen-based monomer having a halogen group, together with a brancher. Conventionally, there was no special consideration on an equivalent weight ratio in a reaction of the monomers and the brancher.

However, a branched multi-block copolymer of the present invention has a specific molar ratio between repeating units of a monomer (and a brancher) having a hydroxy group and repeating units of a monomer (and a brancher) having a halogen group in a hydrophilic or hydrophobic block.

If an equivalent weight ratio of a monomer having a hydroxy group and a monomer having a halogen group is not 1:1 as the present invention does so, a chain does not sufficiently grow and a resulting hydrophilic block has a relatively shorter length. The length reduction of the hydrophilic block can be ascertained from the fact that a copolymer has similar total molecular weight to conventional copolymers but smaller molecular weight of a hydrophilic block than conventional copolymers.

The inventors discovered that a hydrophilic block having the above-mentioned molar ratio has a predetermined length and a unique morphology is created in conformity with the length, and thus it can remarkably decrease water uptake and swelling ratio to improve dimensional stability while not reducing ion conductivity.

And, according to the below-mentioned method for producing a branched multi-block copolymer of the present invention, in the entire reaction for producing a copolymer including formation of a hydrophilic block, in the case that an equivalent weight ratio of reactants (a hydroxy group and a halogen group in monomers and a brancher) is 1:1 when forming a hydrophobic block, the branched multi-block copolymer of the present invention has similar total molecular weight to conventional copolymers, so that it can prevent reduction in mechanical properties of the copolymer itself.

Hereinafter, a method for producing a branched multi-block copolymer according to an embodiment of the present invention is described in detail.

First, a branched hydrophilic block is formed by dissolving a bisphenol-based monomer or an aromatic dihalogen-based monomer; a phenol-based monomer having acid substituents, a bisphenol-based monomer having acid substituents or an aromatic dihalogen-based monomer having acid substituents; and a brancher in an organic solvent, and polymerizing them (S1).

A branched hydrophilic or hydrophobic block according to the present invention is formed by reacting a monomer without acid substituents and a monomer with acid substituents. Here, when one monomer is a dihalogen-based monomer, the other is a phenol-based or bisphenol-based monomer. Based on monomers and a brancher, the total equivalent weight of a hydroxy group to the total equivalent weight of a halogen group is more than 70/100, not exceeding 95/100, or the total equivalent weight of a halogen group to the total equivalent weight of a hydroxy group is more than 70/100, not exceeding 95/100.

If the equivalent weight ratio is 70/100 or less, a hydrophilic block has an excessively short chain and a resulting electrolyte membrane has low ion conductivity of similar level to a random copolymer. If the equivalent weight ratio exceeds 95/100, a resulting electrolyte membrane has an excessively high water uptake and consequently a reduction in dimensional stability.

The hydrophilic block may have various weight average molecular weight ranges depending on the kind of monomers, for example 30,000 to 150,000, however the present invention is not limited in this regard.

In the present invention, the bisphenol-based monomer may include, for example, 4,4'-biphenol and 9,9-bis(4-hydroxyphenyl)fluorene, singularly or in combination, however the present invention is not limited in this regard.

In the present invention, the aromatic dihalogen-based monomer may include, for example, 4,4'-difluorobenzophenone, bis(4-fluorophenyl)sulfone and 2,2-bis(4-hydroxyphenyl)hexafluoropropane, singularly or in combination, however the present invention is not limited in this regard.

The phenol-based monomer having acid substituents, the bisphenol-based monomer having acid substituents or the aromatic dihalogen-based monomer having acid substituents usable in the present invention is a phenol-based monomer having at least one acid substitutent on a phenyl ring, a bisphenol-based monomer having at least one acid substitutent on a phenyl ring, or an aromatic dihalogen-based monomer having at least one acid substitutent on a phenyl ring, respectively, for example, hydroquinonesulfonic acid potassium salt, 2,7-dihydroxynaphthalene-3,6-disulfonic acid disodium salt, 1,7-dihydroxynaphthalene-3-sulfonic acid monosodium salt, 2,3-dihydroxynaphthalene-6-sulfonic acid monosodium salt, potassium 5,5'-carbonylbis(2-fluorobenzene sulfonate) and potassium 2,2'-[9,9-bis(4-hydroxyphenyl)fluorene]sulfonate, singularly or in combination, however the present invention is not limited in this regard. The acid substitutent may include sulfonic acid, sulfonate, carbonic acid, carbonate, phosphoric acid, phosphate and so on, preferably sulfonic acid or sulfonate.

Among them, potassium 5,5'-carbonylbis(2-fluorobenzene sulfonate) may be produced by direct sulfonation of 4,4'-difluorobenzophenone and 4,4'-difluorodiphenyl sulfone with fuming sulfuric acid. Potassium 2,2'-[9,9-bis(4-hydroxyphenyl)fluorene]sulfonate may be produced by direct sulfonation of 9,9-bis(4-hydroxyphenyl)fluorene with chlorosulfuric acid ($ClSO_3H$).

The brancher usable in the present invention directly forms a main chain of the multi-block copolymer, and may include, for example, [3,5-bis(4-fluorobenzoyl)phenyl](4-fluorophenyl)methanone, [3,5-bis(4-fluorosulfonyl)phenyl](4-fluorophenyl)methanone, (3,5-difluoro-4'-fluorobenzophenone) and (3,5-difluoro-4'-fluorophenyl)sulfone, singularly or in combination, however the present invention is not limited in this regard. Among them, [3,5-bis(4-fluorobenzoyl)phenyl](4-fluorophenyl)methanone may be produced by Friedel-Crafts reaction of (1,3,5-benzenetricarbonyltrichloride), aluminumchloride and fluorobenzene. The other brancher may be also produced by a similar Friedel-Crafts reaction.

The present invention is not limited to a specific organic solvent usable in polymerization of a hydrophilic block and/or a hydrophobic block if it can favorably dissolve a reactant and a product. For example, the organic solvent may include, in particular, N,N-dimethylacetamide (DMAc), N-methylpyrrolidone (NMP), dimethylsulfoxide (DMSO) and N,N-dimethylformamide (DMF), singularly or in combination, however the present invention is not limited in this regard.

In the present invention, a catalyst known in the art may be used in monomer polymerization to obtain a hydrophilic block and/or a hydrophobic block. Typically, a carbonate catalyst is used, however the present invention is not limited in this regard. For example, the carbonate catalyst may include sodium carbonate, potassium carbonate, rubidium carbonate, magnesium carbonate, calcium carbonate and barium carbonate, or mixtures thereof, however the present invention is not limited in this regard.

As mentioned above, after each component for forming a branched hydrophilic block is prepared, the monomers and the catalyst are dissolved in an organic solvent, and agitated at 140 to 150° C. for 3 to 5 hours. Water is removed from the mixture. Water may be removed as an azeotrope. In this case, benzene or toluene may be used with water as an azeotrope. A typical dean-stark trap may be used to remove the azeotrope. After the azeotrope is removed, polymerization is performed by increasing a reaction temperature up to 170 to 190° C. and agitating the mixture at the reaction temperature for 6 to 24 hours, so that a branched hydrophilic block is obtained.

Next, the branched hydrophilic block obtained in the step S1, a bisphenol-based monomer, an aromatic dihalogen-based monomer, and a brancher are dissolved in an organic solvent and polymerized to produce a hydrophobic block and a branched multi-block copolymer at the same time (S2).

A coupling reaction may occur to a terminal (K) of the branched hydrophobic block represented as the above-mentioned chemical formula 3 and a terminal (K) of the branched hydrophilic block represented as the above-mentioned chemical formula 4. Through the coupling reaction, a branched multi-block copolymer can be produced, in which the hydrophobic block and the hydrophilic block are chemically coupled in an alternate manner. As mentioned above, the coupling reaction according to the present invention can produce a hydrophobic block and a branched multi-block copolymer at the same time.

An equivalent weight ratio of the above-mentioned monomers of the hydrophobic block according to the present invention may be determined in consideration of proper ion exchange capacity (IEC) of the branched multi-block copolymer and the formed hydrophilic block. However, as mentioned above, the monomers are added such that an equivalent weight ratio of the reactants (a hydroxy group and a halogen group in the monomers and the brancher) is 1:1 in the entire reaction for producing the copolymer.

When the monomers for forming a hydrophobic block are prepared, a reaction of the same condition range and process as the hydrophilic block is performed to produce a hydrophobic block and a branched multi-block copolymer according to the present invention. For example, a resultant product obtained through a polymerization reaction of a hydrophilic block is diluted, filtered and washed to separate a hydrophilic block therefrom. The obtained hydrophilic block may be mixed with monomers for forming a hydrophobic block and polymerized. Alternatively, after temperature of a flask containing the hydrophilic block is lowered down to 50 to 70° C., polymerization may be performed by putting monomers for forming a hydrophobic block in the flask.

The hydrophilic block, the monomers for forming a hydrophobic block and a catalyst are dissolved in an organic solvent and agitated at 140 to 150° C. for 3 to 5 hours, and water is removed from the mixture. Water may be removed as an azeotrope. In this case, benzene or toluene may be used with water as an azeotrope. A typical dean-stark trap may be used to remove the azeotrope. After the azeotrope is removed, a polymerization reaction may be performed as mentioned above by agitating the mixture at 170 to 190° C. for 6 to 24 hours.

After the polymerization reaction is completed, a salt among the reaction products is removed by directly adding distilled water, methanol or acetone to the reaction products or by diluting the reaction products with distilled water, methanol or acetone and filtering, so that a polymer slurry is obtained. Next, the slurry is filtered, washed with hot distilled water (~80° C.) and/or methanol several times to adjust the pH level to neutral, and filtered to obtain a branched multi-block copolymer. The multi-block copolymer according to the present invention may have a weight average molecular weight of 200,000 to 2,000,000, however the present invention is not limited in this regard.

According to another embodiment of the present invention, a method for producing a branched multi-block copolymer comprises (S1) forming a branched hydrophobic block by dissolving a bisphenol-based monomer, an aromatic dihalogen-based monomer and a brancher in an organic solvent and polymerizing them, and (S2) dissolving said branched hydrophobic block formed in the step (S1) or a bisphenol-based monomer or an aromatic dihalogen-based monomer; a phenol-based monomer having acid substitutents, a bisphenol-based monomer having acid substituents or an aromatic dihalogen-based monomer having acid substituents; and a brancher in an organic solvent and polymerizing them to produce a branched hydrophilic block and a branched multi-block copolymer at the same time. This embodiment has the same kind of monomers and a brancher and the same reaction conditions as the previous embodiment except a forming order of a hydrophilic block and a hydrophobic block. In particular, an equivalent weight ratio in the monomers and the brancher is determined in consideration that a hydrophilic block to be formed has a predetermined range of molar ratio. However, as mentioned above, the monomers are added such that an equivalent weight ratio of reactants (a hydroxy group and a halogen group in the monomers and the brancher) is 1:1 in the entire reaction for producing a copolymer.

And, the present invention provides an acidified branched multi-block copolymer produced from substitution of acid for an acid salt by adding an acid solution to a branched multi-block copolymer having repeating units represented as the above-mentioned chemical formula 1, wherein Q is $-SO_3^- M^+$, $-COO^-M^+$, $-PO_3H^-M^+$ or $-PO_3^{2-}2M^+$.

In other words, when Q is $-SO_3^-M^+$, $-COO^-M^+$, $-PO_3H^-M^+$ or $-PO_3^{2-}2M^+$, the produced branched multi-block copolymer contains an acid salt. A hydrochloric acid or sulfuric acid solution is added to the acid salt form copolymer to substitute acid for an acid salt. In this way, an acidified branched multi-block copolymer is produced. At this time, concentration of the acid solution is preferably 0.5 to 10 M, and the acidulation time is 1 to 24 hours.

The acidified branched multi-block copolymer can be used to manufacture an electrolyte membrane. A manufacturing method may be well known in the art. For example, the acidified branched multi-block copolymer is added to a typical organic solvent and applied on a substrate at a thickness from several tens to several hundreds of μm by means of a film applicator. After a dry process, an electrolyte membrane can be obtained. The dry process may be performed by, for example, slowly increasing temperature up to 80° C. and drying for about 24 hours and then at 120° C. for about 24 hours.

The electrolyte membrane may be applied to a fuel cell. The fuel cell according to the present invention may comprise a stack including a plurality of membrane electrode assemblies with a bipolar plate interposed therebetween, each membrane electrode assembly having electrodes attached to the opposite sides of said electrolyte membrane, a fuel supply unit for supplying a fuel to the stack, and an oxidant supply unit for supplying an oxidant to the stack. The manufacturing method may be well known in the art.

Hereinafter, the present invention will be described in detail through specific examples. However, the description proposed herein is just a preferable example for the purpose of illustrations only, not intended to limit the scope of the invention, so it should be understood that the examples are provided for a more definite explanation to an ordinary person skilled in the art.

Example 1

<Formation of Hydrophilic Block>

0.95 equivalent weight of hydroquinonesulfonic acid potassium salt, 0.97 equivalent weight of 4,4'-difluorobenzophenone and 0.02 equivalent weight (actual reaction equivalent weight is 0.03(0.02*1.5)) of [3,5-bis(4-fluorobenzoyl)phenyl](4-fluorophenyl)methanone were put in 1 L reactor having a dean-stark trap in combination with a condenser. A reaction was initiated under a nitrogen atmosphere using dimethyl sulfoxide (DMSO) and benzene as a solvent and potassium carbonate as a catalyst. Next, the reactants were agitated in an oil bath at 140° C. for 4 hours. Benzene was distilled off and water as an azeotrope was removed by use of molecular sieves of the dean-stark trap. After a reaction temperature was increased up to 180° C., a condensation polymerization reaction was performed for 20 hours.

<Production of Hydrophobic Block and Branched Multi-Block Copolymer>

The temperature of a reaction product obtained from the above-mentioned reaction was lowered down to 60° C., and 0.29 equivalent weight of 4,4'-difluorobenzophenone, 0.3475 equivalent weight of 9,9-bis(4-hydroxyphenyl)fluorene and 0.005 equivalent weight (actual reaction equivalent weight is 0.0075(0.005*1.5)) of [3,5-bis(4-fluorobenzoyl)phenyl](4-fluorophenyl)methanone were put in the above-mentioned reactor. A reaction was initiated again under a nitrogen atmosphere using dimethyl sulfoxide (DMSO) and benzene as a solvent and potassium carbonate as a catalyst. Next, the reactants were agitated again in an oil bath at 140° C. for 4 hours. Benzene was distilled off and water as an azeotrope was removed by use of molecular sieves of the dean-stark trap. After a reaction temperature was increased up to 180° C., a condensation polymerization reaction was performed for 20 hours.

Next, the temperature of a reaction product was lowered down to a room temperature, and DMSO was added to the reaction product to dilute the reaction product. The diluted product was poured into excess methanol to separate a copolymer from the solvent. Excess potassium carbonate was removed from the copolymer using water, and filtered. The filtered copolymer was dried in a vacuum oven of 80° C. for 12 or more hours to produce a branched multi-block copolymer in which a hydrophobic block and a hydrophilic block are chemically bonded to each other in an alternate manner. At this time, the number (n) of repeating units of the hydrophilic block was about 340 except a small amount of brancher.

Example 2

A branched multi-block copolymer was produced in the same way as example 1 except that 0.9 equivalent weight of hydroquinonesulfonic acid potassium salt, 0.97 equivalent weight of 4,4'-difluorobenzophenone and 0.02 equivalent weight (actual reaction equivalent weight is 0.03) of [3,5-bis (4-fluorobenzoyl)phenyl](4-fluorophenyl)methanone were used to form a hydrophilic block, and 0.2275 equivalent weight of 4,4'-difluorobenzophenone, 0.335 equivalent weight of 9,9-bis(4-hydroxyphenyl)fluorene and 0.005 equivalent weight (actual reaction equivalent weight is 0.0075) of [3,5-bis(4-fluorobenzoyl)phenyl](4-fluorophenyl)methanone were used to form a hydrophobic block. At this time, the number (n) of repeating units of the hydrophilic block was about 200 except a small amount of brancher.

Example 3

A branched multi-block copolymer was produced in the same way as example 1 except that 0.85 equivalent weight of hydroquinonesulfonic acid potassium salt, 0.97 equivalent weight of 4,4'-difluorobenzophenone and 0.02 equivalent weight (actual reaction equivalent weight is 0.03) of [3,5-bis (4-fluorobenzoyl)phenyl](4-fluorophenyl)methanone were used to form a hydrophilic block, and 0.15 equivalent weight of 4,4'-difluorobenzophenone, 0.3075 equivalent weight of 9,9-bis(4-hydroxyphenyl)fluorene and 0.005 equivalent weight (actual reaction equivalent weight is 0.0075) of [3,5-bis(4-fluorobenzoyl)phenyl ](4-fluorophenyl)methanone were used to form a hydrophobic block. At this time, the number (n) of repeating units of the hydrophilic block was about 100 except a small amount of brancher.

Comparative Example 1

A branched multi-block copolymer was produced in the same way as example 1 except that 1 equivalent weight of hydroquinonesulfonic acid potassium salt, 0.97 equivalent weight of 4,4'-difluorobenzophenone and 0.02 equivalent weight (actual reaction equivalent weight is 0.03) of [3,5-bis (4-fluorobenzoyl)phenyl](4-fluorophenyl)methanone were used to form a hydrophilic block, and 0.35 equivalent weight of 4,4'-difluorobenzophenone, 0.3575 equivalent weight of 9,9-bis(4-hydroxyphenyl)fluorene and 0.005 equivalent weight (actual reaction equivalent weight is 0.0075) of [3,5-bis(4-fluorobenzoyl)phenyl](4-fluorophenyl)methanone were used to form a hydrophobic block. At this time, the number (n) of repeating units of the hydrophilic block was about 440 except a small amount of brancher.

Comparative Example 2

A branched multi-block copolymer was produced in the same way as example 1 except that 0.7 equivalent weight of hydroquinonesulfonic acid potassium salt, 0.97 equivalent weight of 4,4'-difluorobenzophenone and 0.02 equivalent weight (actual reaction equivalent weight is 0.03) of [3,5-bis (4-fluorobenzoyl)phenyl](4-fluorophenyl)methanone were used to form a hydrophilic block, and 0.0065 equivalent weight of 4,4'-difluorobenzophenone, 0.314 equivalent weight of 9,9-bis(4-hydroxyphenyl)fluorene and 0.005 equivalent weight (actual reaction equivalent weight is 0.0075) of [3,5-bis(4-fluorobenzoyl)phenyl](4-fluorophenyl)methanone were used to form a hydrophobic block. At this time, the number (n) of repeating units of the hydrophilic block was about 35 except a small amount of brancher.

Experimental Example

<Manufacture of Polymer Electrolyte Membrane for Fuel Cell>

The synthesized hydrophobic-hydrophilic multi-block polymer was completely dissolved in a solvent, N,N-dimethyl acetamide (DMAc), at a concentration of 7 to 15 wt %, and filtered, and was prepared as a solution capable of film casting. The solution was cast onto a glass plate by use of a doctor blade on a horizontal support of an applicator in a clean bench of 40° C., so that a polymer film was formed. The polymer film was soft baked for 2 hours, and then baked in an oven of 100° C. for 24 hours. Subsequently, the glass plate was taken from the oven and dipped into water for a while. The cast polymer film was separated from the glass plate. The polymer film was dipped in 10% sulfuric acid aqueous solution of 80° C. for 2 or more hours, so that sulfonic acid potassium salt form of the polymer was converted into sulfonic acid form. The polymer film was washed with distilled water to remove excess acid from the surface thereof. In this way, a polymer electrolyte membrane for a fuel cell was manufactured.

1. Evaluation of Dimensional Stability

The water uptake and swelling ratio are indexes indicating how much the polymer electrolyte membrane swells under fully wet conditions. Each electrolyte membrane obtained from the experiment was put in distilled water at room temperature for 1 day, and after the electrolyte membrane completely swelled, the surface of the membrane was wiped quickly to remove water. Wet mass and diagonal length of the membrane was measured. After the membrane was put in an oven of 80° C. for 1 day, dry mass and diagonal length of the membrane was measured. The water uptake and swelling ratio was computed by the following equations.

[Mathematical equation 1]
$$\text{WATER UPTAKE} = \frac{\text{WET MASS OF MEMBRANE} - \text{DRY MASS OF MEMBRANE}}{\text{DRY MASS OF MEMBRANE}} \times 100 \ (\%)$$

[Mathematical equation 2]
$$\text{SWELLING RATIO} = \frac{\text{WET LENGTH OF MEMBRANE} - \text{DRY LENGTH OF MEMBRANE}}{\text{DRY LENGTH OF MEMBRANE}} \times 100 \ (\%)$$

Figure 1:
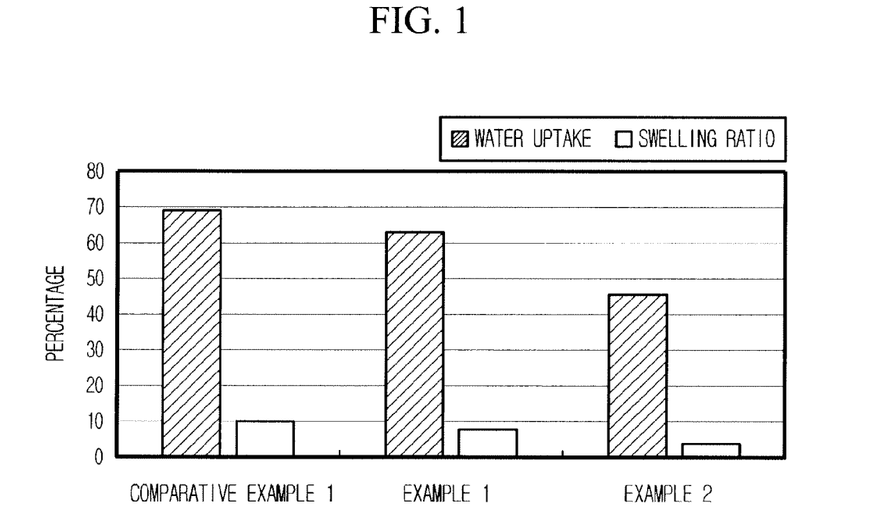
FIG. 1 is a graph showing water uptake and swelling ratio of electrolyte membranes of examples 1 and 2 according to the present invention and comparative example 1.

FIG. 1 shows the evaluation results of dimensional stability of each polymer electrolyte membrane according to examples 1 and 2 and comparative example 1.

As shown in FIG. 1, a hydrophilic block having repeating units of a specific molecular weight range according to the present invention has remarkable reduction in water uptake and swelling ratio.

2. Evaluation of Electrical Performance

Each polymer electrolyte membrane according to examples 1 and 2 was evaluated for electrical performance.

Specifically, a membrane electrode assembly was manufactured using each polymer electrolyte membrane according to examples 1 and 2. First, electrodes were formed using a spray coating method by spraying 10BC GDL at Pt content of 0.4 mg/cm². Subsequently, a membrane electrode assembly was made under conditions of 140° C. and 1 bar. A plurality of unit cells were stacked using the membrane electrode assembly to form a fuel cell. A current-voltage graph was plotted under condition of a fixed flow rate of an anode and a cathode using a test station, and the results are shown in FIG. 2.

Figure 2:
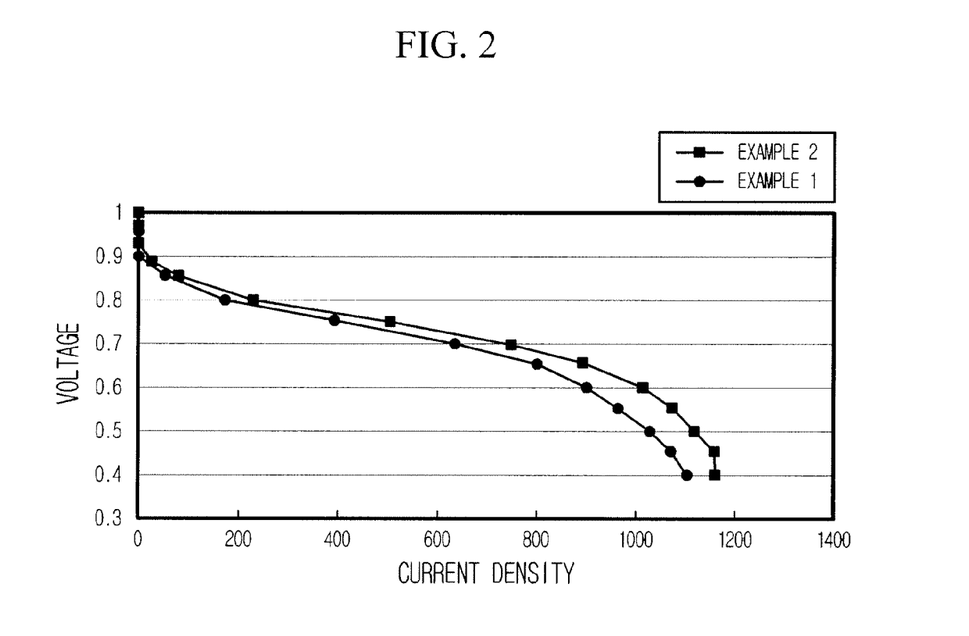
FIG. 2 is a graph showing electrical performance of examples 1 and 2 according to the present invention.

As shown in FIG. 2, in a voltage area with a measurement value having effective electrical performance of the fuel cell, examples 1 and 2 have excellent electrical performance. In particular, example 1 exhibits better electrical performance than example 2.

3. Relationship Between Equivalent Weight of Monomer and Polymer Chain Length

Figure 3:
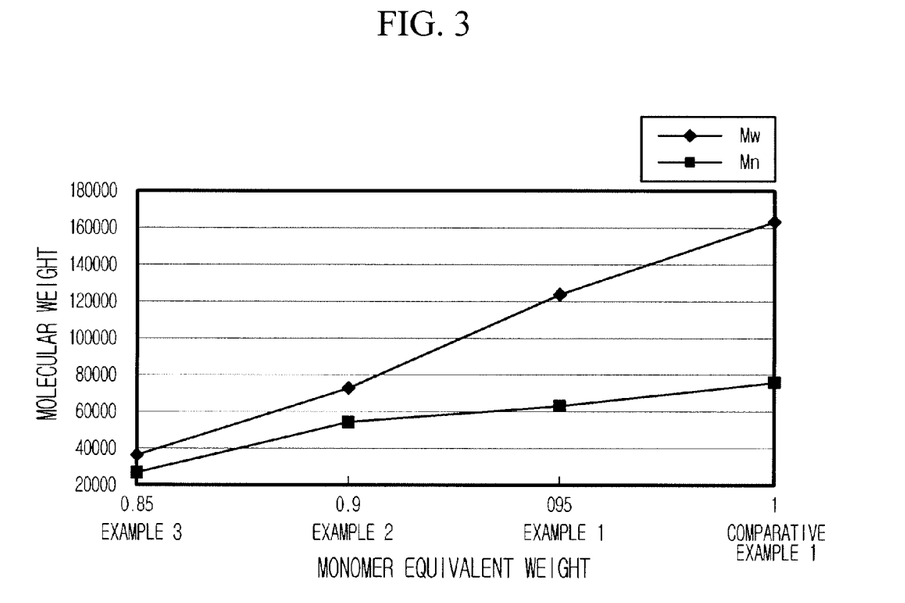
FIG. 3 is a graph showing molecular weight of hydrophilic blocks of examples 1 to 3 according to the present invention and comparative example 1.

The molecular weight of each hydrophilic block polymer according to examples 1 to 3 and comparative example 1 was measured, and the results are shown in FIG. 3.

Referring to FIG. 3, the present invention having smaller equivalent weight of monomers of a hydrophilic block has smaller total molecular weight than comparative example. The hydrophilic block has a small branching ratio, and thus the hydrophilic block is similar to linear chain. Accordingly, small molecular weight means relatively shorter polymer chain length. That is, the hydrophilic blocks according to examples 1 to 3 of the present invention have smaller chain length than a conventional hydrophilic block (comparative example). As mentioned above, an electrolyte membrane manufactured from a copolymer of the present invention has excellent electrical performance and improved dimensional stability.

4. Comparison in Terms of Molecular Weight of Hydrophilic Block, Ion Exchange Capacity (IEC) and Ion Conductivity Each copolymer according to examples 1 to 3 and comparative examples 1 and 2 and a random copolymer having similar IEC to the example copolymer were measured with regard to molecular weight of a hydrophilic block, IEC and ion conductivity, and the results are shown in the following table 1 (Hq equivalent weight: equivalent weight of hydroquinonesulfonic acid potassium salt).

TABLE 1

| | Hq equivalent weight | Mw (g/mol) | IEC (meq./g) | Ion conductivity (S/cm) |
|---|---|---|---|---|
| Comparative example 1 | 1.00 | 163,000 | 1.63 | 0.066 |
| Example 1 | 0.95 | 124,000 | 1.61 | 0.078 |
| Example 2 | 0.90 | 72,600 | 1.63 | 0.083 |
| Example 3 | 0.85 | 36,900 | 1.57 | 0.071 |
| Comparative example 2 | 0.70 | 13,000 | 1.56 | 0.047 |
| Random polymer | — | — | 1.59 | 0.043 |

As shown in the above-mentioned table 1, a copolymer with a specific range of equivalent weight according to the present invention has shorter hydrophilic blocks and better ion conductivity.

What is claimed is:

1. A branched multi-block copolymer, comprising:
a hydrophobic block having a plurality of repeating units represented as chemical formula 1; and
a hydrophilic block having a plurality of repeating units represented as chemical formula 2,

[Chemical formula 1]

[Chemical formula 2]

wherein A, X and Y are each

-continued independently,
R is —NO₂ or —CF₃,
Z is

Q is —SO₃H, —SO₃⁻M⁺, —COOH, —COO⁻M⁺, —PO₃H₂, —PO₃H⁻M⁺ or —PO₃²⁻2M⁺, and M is Na or K, B is G is X, and G' is Z, $0 < u/t < 1$, and $0 < w/v < 1$, $0.7 < (e+1.5*g)/(f+h) \leqq 0.95$ or $0.7 < (f+h)/(e+1.5*g) \leqq 0.95$, and $a+e+1.5(c+g)=f+h+b+d$, in which a, b, c, d, e, f, g and h are molar ratios, and the hydrophilic block has a total number of repeating units of 100 to 350.

2. A branched multi-block copolymer electrolyte membrane manufactured from the branched multi-block copolymer defined in claim 1.

3. A fuel cell comprising the branched multi-block copolymer electrolyte membrane defined in claim 1.

* * * * *